(12) United States Patent
Matsushita et al.

(10) Patent No.: US 8,675,248 B2
(45) Date of Patent: Mar. 18, 2014

(54) CONTROL DEVICE, IMAGE FORMING DEVICE, IMAGE FORMING SYSTEM, CONTROL METHOD AND COMPUTER READABLE MEDIUM

(75) Inventors: Issei Matsushita, Kanagawa (JP); Masafumi Sugawara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 766 days.

(21) Appl. No.: 12/796,299

(22) Filed: Jun. 8, 2010

(65) Prior Publication Data

US 2011/0141498 A1 Jun. 16, 2011

(30) Foreign Application Priority Data

Dec. 14, 2009 (JP) ................................. 2009-283089

(51) Int. Cl.
*G06F 15/00* (2006.01)
*G06K 1/00* (2006.01)
*G06F 3/12* (2006.01)
*G03G 15/01* (2006.01)

(52) U.S. Cl.
USPC ............ 358/1.9; 358/1.15; 399/302; 399/303

(58) Field of Classification Search
None
See application file for complete search history.

(56) References Cited

U.S. PATENT DOCUMENTS

| | | | |
|---|---|---|---|
| 2003/0099492 A1* | 5/2003 | Maeyama et al. | 399/302 |
| 2008/0166137 A1 | 7/2008 | Kanai | |
| 2009/0034998 A1 | 2/2009 | Omata et al. | |
| 2009/0237734 A1 | 9/2009 | Owen | |
| 2009/0303504 A1 | 12/2009 | Iinuma et al. | |
| 2010/0007902 A1* | 1/2010 | Kikuchi | 358/1.9 |
| 2010/0027040 A1* | 2/2010 | Kuroda | 358/1.9 |

FOREIGN PATENT DOCUMENTS

| | | |
|---|---|---|
| CN | 101364065 A | 2/2009 |
| JP | A-2008-170474 | 7/2008 |
| JP | A-2009-063744 | 3/2009 |
| JP | A-2009-230760 | 10/2009 |

OTHER PUBLICATIONS

Office Action dated Jan. 3, 2014 issued in Chinese Patent Application No. 201010214817.0 (with English Translation).

* cited by examiner

*Primary Examiner* — Marivelisse Santiago Cordero
*Assistant Examiner* — Moustapha Diaby
(74) *Attorney, Agent, or Firm* — Oliff & Berridge, PLC

(57) ABSTRACT

An image formation control device is provided with a control unit. The control unit controls generation of information for forming a transparent image on the basis of settings that include at least a superimposition region and a superimposition sequence, when plurality of images which include the transparent image and a colored image are superimposed and synthesized.

11 Claims, 19 Drawing Sheets

FIG.10
FIRST IMAGE
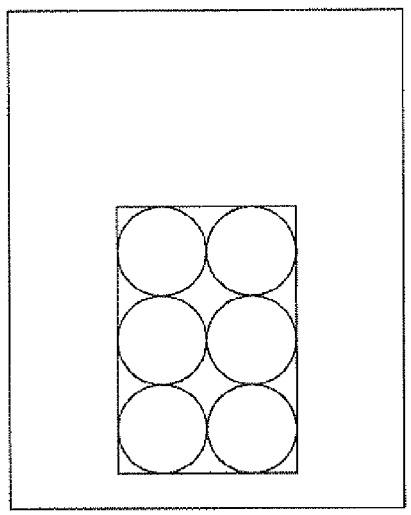
SECOND IMAGE
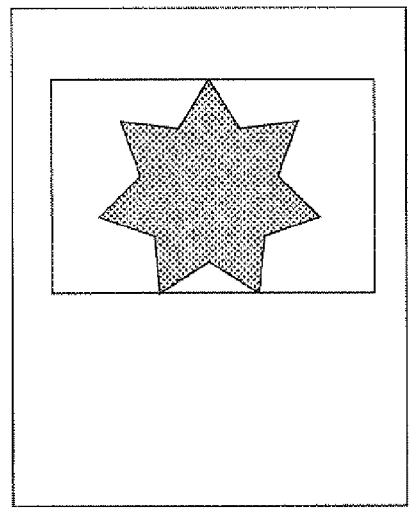
FIRST
TRANSPARENT IMAGE
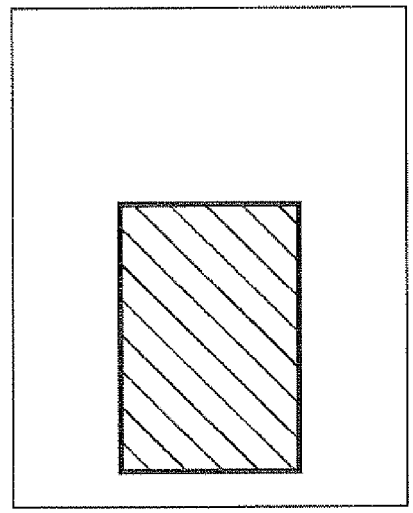
SECOND
TRANSPARENT IMAGE
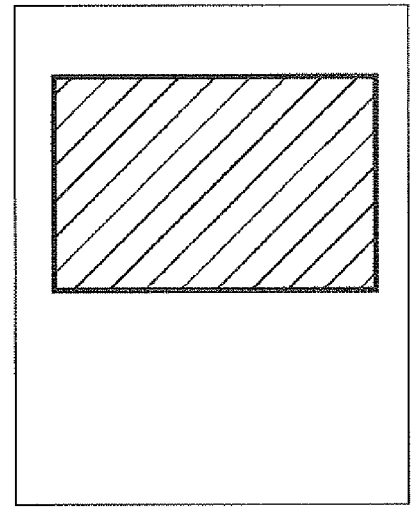

FIG.12
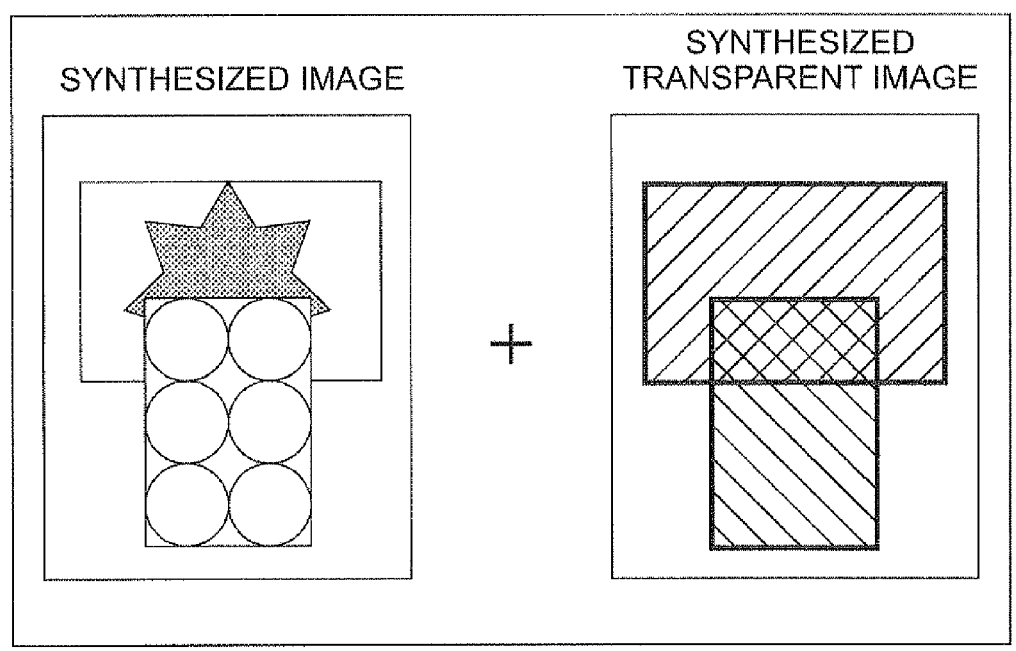
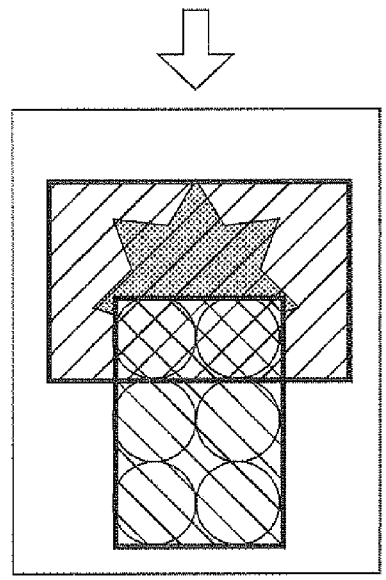
DENSITY 50%  
DENSITY 100% 

FIG.13
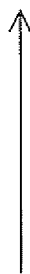
ABOVE
BELOW
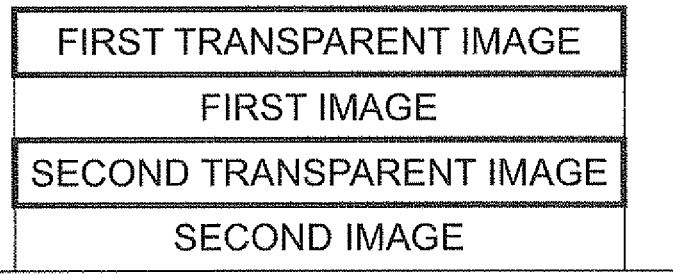

FIG.15
FIRST IMAGE
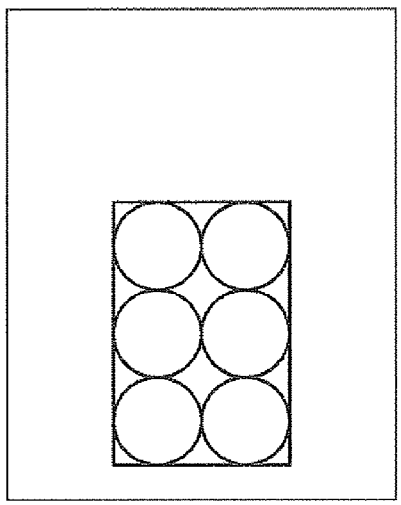
SECOND IMAGE
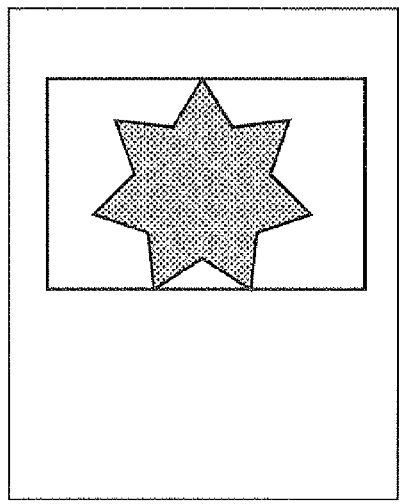
FIRST
TRANSPARENT IMAGE
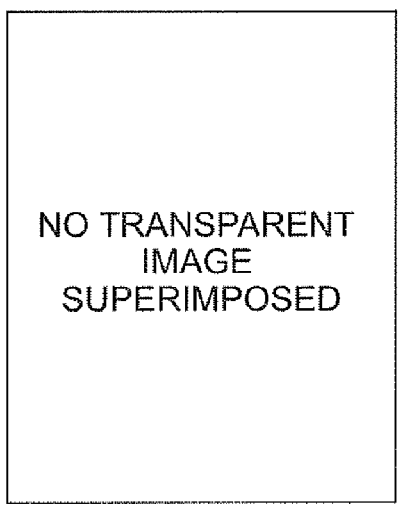
SECOND
TRANSPARENT IMAGE
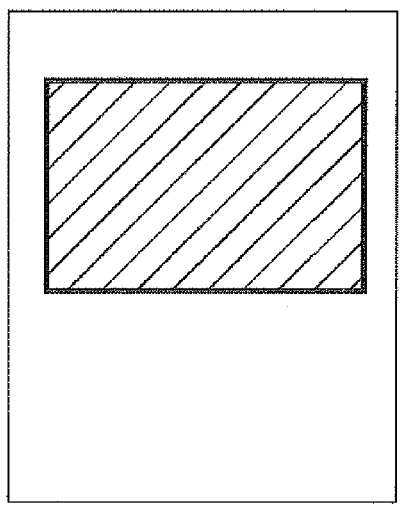

CONTROL DEVICE, IMAGE FORMING DEVICE, IMAGE FORMING SYSTEM, CONTROL METHOD AND COMPUTER READABLE MEDIUM

CROSS-REFERENCE TO RELATED APPLICATIONS

This application is based on and claims priority under 35 USC 119 from Japanese Patent Application No. 2009-283089 filed Dec. 14, 2009.

BACKGROUND

Technical Field

The present invention relates to a control device, an image forming device, an image forming system, a control method, and a computer readable medium storing a program for control processing.

SUMMARY

According to an aspect of the invention, there is provided a control device including: a control unit that controls generation of information for forming a transparent image on the basis of settings that include at least a superimposition region and a superimposition sequence, when plural images which include the transparent image and a colored image are superimposed and synthesized.

BRIEF DESCRIPTION OF THE DRAWINGS

Exemplary embodiments of the present invention will be described in detail based on the following figures, wherein:

FIG. 10 is a diagram illustrating examples of a first image and a transparent image to be superimposed with the first image and of a second image and a transparent image to be superimposed with the second image.

FIG. 12 is a diagram illustrating formation results when an image is formed by superimposing the respective images illustrated in FIG. 10 in the sequence illustrated in FIG. 11.

FIG. 13 is a diagram illustrating an example of a sequence in which the respective images illustrated in FIG. 10 are superimposed.

FIG. 15 is a diagram illustrating examples of a first image and a transparent image to be superimposed with the first image and of a second image and a transparent image to be superimposed with the second image.

DETAILED DESCRIPTION

Herebelow, an exemplary embodiment will be described in detail with reference to the drawings.

Figure 1:
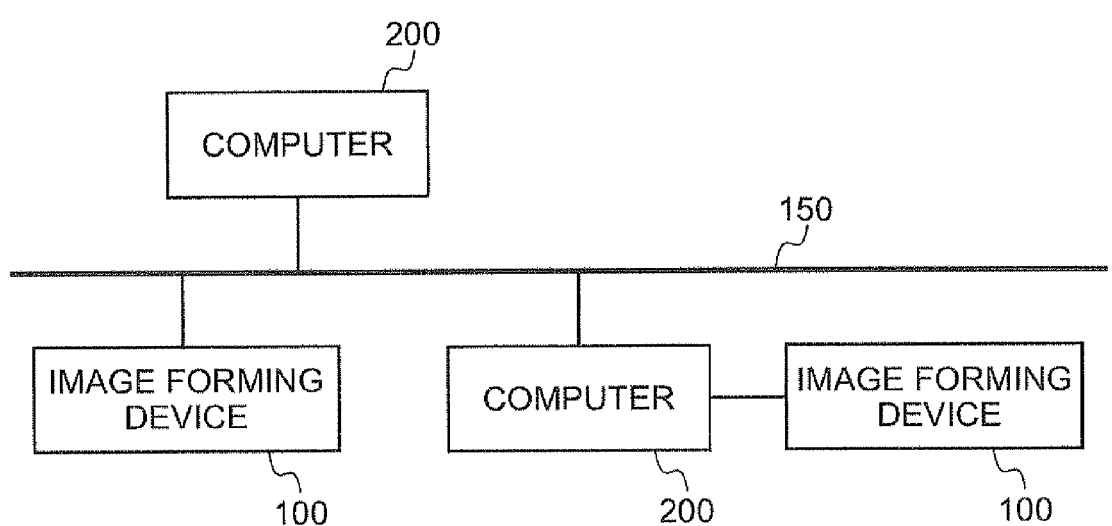
FIG. 1 is a diagram illustrating a state in which a computer is connected via a communications unit to an image forming device relating to an exemplary embodiment.

In the present exemplary embodiment, as illustrated in FIG. 1, an image forming device 100 and a computer 200 are connected via a communications unit 150. The communications unit 150 may be a public circuit, and may be a network such as the Internet, a local area network (LAN), a wide area network (WAN) or the like. Although not illustrated, if the image forming device 100 and computer 200 are provided in a one-to-one correspondence, the communications unit 150 may be a cable connecting the image forming device 100 and the computer 200 peer-to-peer. The communications unit 150 may be a wireless communications unit and may be a wired communications unit. The image forming device 100 may, rather than being directly connected to the communications unit 150, be connected, for example, to the computer 200 that acts as a print server.

Figure 2:
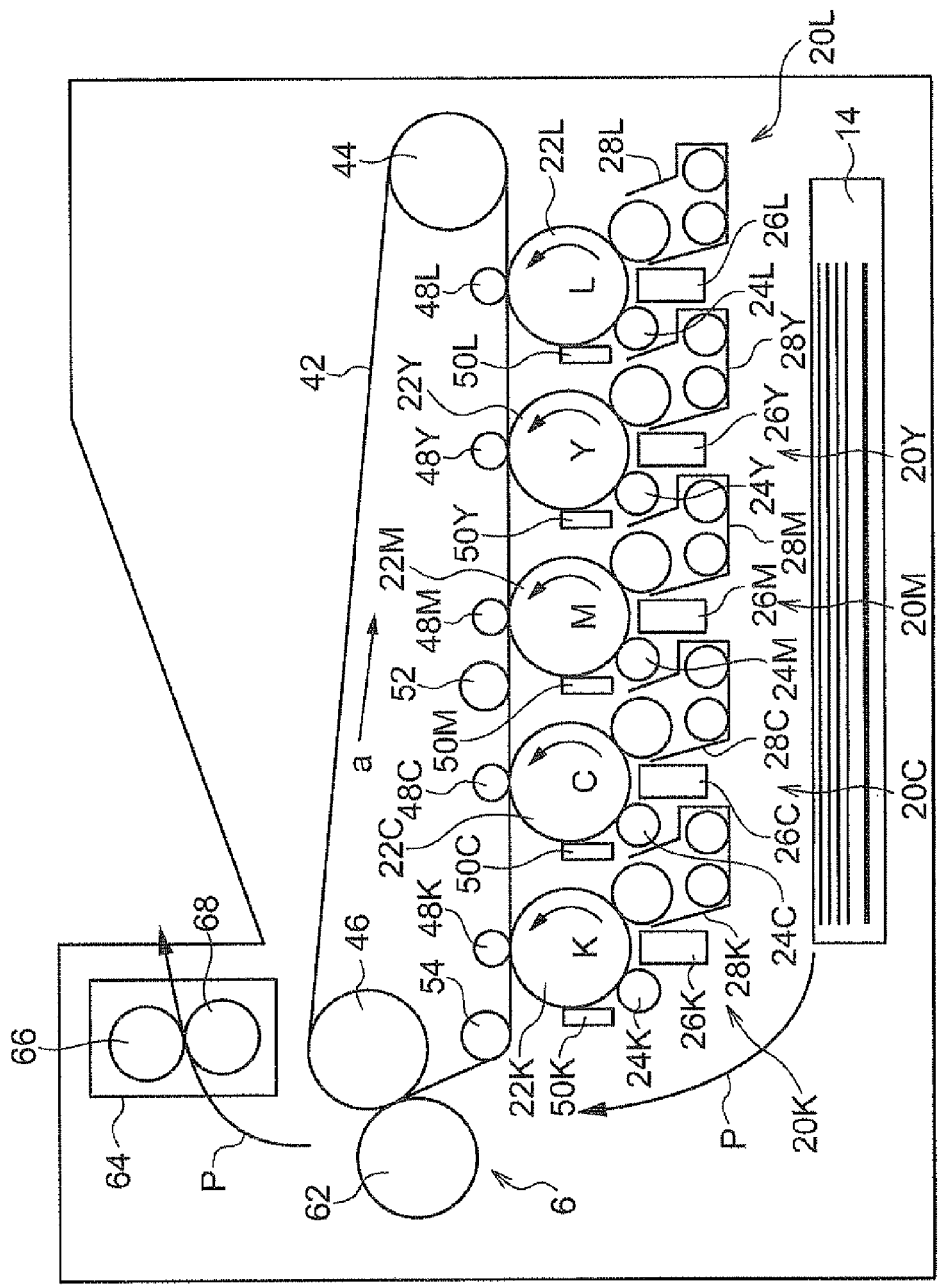
FIG. 2 is a diagram illustrating schematic structure of an image formation section of the image forming device relating to the exemplary embodiment.

The image forming device 100 is provided with an image forming section that forms images on recording mediums and an image reading section that reads images. FIG. 2 is a diagram illustrating schematic structure of the image forming section of the image forming device 100. Hereinafter, the formation of images may be referred to as printing.

The image forming section is provided with an intermediate transfer belt 42, which turns in the direction indicated by arrow a in FIG. 2. From an upstream side to a downstream side along the turning direction a of the intermediate transfer belt 42 (hereinafter referred to as a process direction), an L image forming unit 20L that forms a transparent image, a Y image forming unit 20Y that forms a Y (yellow) image, an M image forming unit 20M that forms an M (magenta) image, a C image forming unit 20C that forms a C (cyan) image, and a K image forming unit 20K that forms a K (black) image are provided in a tandem formation.

The L image forming unit 20L is an image forming unit that uses a transparent toner (clear toner), which transmits visible light and forms transparent images that are low in visibility, to form transparent images.

As illustrated in FIG. 2, in the image forming section, the L image forming unit 20L, Y image forming unit 20Y, M image forming unit 20M, C image forming unit 20C and K image forming unit 20K are provided with, respectively: photoreceptors 22L, 22Y, 22M, 22C and 22K; electrostatic chargers 24L, 24Y, 24M, 24C and 24K that charge up the surfaces of, respectively, the photoreceptors 22L, 22Y, 22M, 22C and 22K; exposure devices 26L, 26Y, 26M, 26C and 26K that expose the charged photoreceptors 22L, 22Y, 22M, 22C and 22K and form electrostatic latent images in accordance with respectively corresponding image data; developing devices 28L, 28Y, 28M, 28C and 28K that adhere, respectively, clear toner, yellow toner, magenta toner, cyan toner and black toner to the surfaces of the photoreceptors 22L, 22Y, 22M, 22C and 22K at which the electrostatic latent images have been formed and develop the same; and cleaners 50L, 50Y, 50M, 50C and 50K that clean the surfaces of the photoreceptors 22L, 22Y, 22M, 22C and 22K after a first transfer to remove waste toner and the like.

The image forming section is also provided with: a conveyance roller 44 that causes the intermediate transfer belt 42 to run in the direction of arrow a by turning while touching against an inner periphery face of the intermediate transfer belt 42; a backup roller 46 that retains the intermediate transfer belt 42 in a tensed state in co-operation with the conveyance roller 44, and structures a second transfer unit 6; and auxiliary rollers 52 and 54 that touch against the inner periphery face of the intermediate transfer belt 42 while turning to follow the turning of the conveyance roller 44. The image forming section is also provided with: a transfer roller 48L that transfers a transparent image formed by the L image forming unit 20L onto an outer periphery face of the intermediate transfer belt 42; a transfer roller 48Y that transfers a yellow image formed by the Y image forming unit 20Y onto the outer periphery face of the intermediate transfer belt 42; a transfer roller 48M that transfers a magenta image formed by the M image forming unit 20M onto the outer periphery face of the intermediate transfer belt 42; a transfer roller 48C that transfers a cyan image formed by the C image forming unit 20C onto the outer periphery face of the intermediate transfer belt 42; and a transfer roller 48K that transfers a black image formed by the K image forming unit 20K onto the outer periphery face of the intermediate transfer belt 42.

The transfer rollers 48L, 48Y, 48M, 48C and 48K all turn while touching against the inner periphery face of the intermediate transfer belt 42, and are transfer rollers that transfer the aforementioned developed transparent image, yellow image, magenta image, cyan image and black image onto the intermediate transfer belt 42. The transfer rollers 48L, 48Y, 48M, 48C and 48K are arranged along the turning direction a in the order transfer rollers 48L, 48Y, 48M, 48C, 48K. The transfer rollers 48L, 48Y, 48M, 48C and 48K are each connected to a first transfer bias power supply (described below), and respective pre-specified voltages are applied thereto.

A paper accommodation section 14 is provided that accommodates recording paper which serves as a recording medium onto which the images that have been transferred onto the intermediate transfer belt 42 are to be transferred. The arrow indicated with a P represents a conveyance path of the recording paper.

The second transfer unit 6 is structured by the backup roller 46 and a second transfer roller 62. The second transfer roller 62 is disposed to sandwich the intermediate transfer belt 42 at the opposite side thereof from the backup roller 46. The backup roller 46 turns while pressing against recording paper on the outer periphery face of the intermediate transfer belt 42, and transfers the images that have been transferred onto the outer periphery face of the intermediate transfer belt 42 onto the recording paper. The second transfer roller 62 is connected to a second transfer bias power supply (described below), and a pre-specified voltage is applied thereto.

A fixing device 64 is disposed at a downstream side relative to the backup roller 46. The fixing device 64 is structured with a heating roller 66, which is at a high temperature, and a backup roller 68. The recording paper to which an image has been transferred at the second transfer unit 6 is nipped between the heating roller 66 and the backup roller 68 of the fixing device 64, and here toner is fused and solidified to be fixed to the recording paper.

At the image forming device 100, the charged photoreceptors 22L, 22Y, 22C, 22M and 22K are exposed, and thus potentials are lowered at exposed regions and electrostatic latent images are formed. Toners that are charged to the same polarity as a charging polarity of the photoreceptors 22L, 22Y, 22C, 22M and 22K are electrically adhered to the reduced potential portions of the charged surfaces of the photoreceptors 22L, 22Y, 22C, 22M and 22K. Thus, the electrostatic latent images are developed. The toners are electrically attracted toward the transfer rollers 48L, 48Y, 48C, 48M and 48K, to which transfer voltages at the opposite polarity from the toner are applied. As a result, the (toner) images are transferred from the photoreceptors 22L, 22Y, 22C, 22M and 22K to the intermediate transfer belt 42 and superimposed. At the second transfer unit 6, the toner on the intermediate transfer belt 42 is electrically attracted toward the second transfer roller 62, to which a transfer voltage of the opposite polarity to the toner is applied, and the toner is transferred onto the recording paper. The toner that has been transferred onto the recording paper is fixed to the recording paper at the fixing device 64 as described above. When a black and white image is being formed rather than color, image formation operations are not conducted at the Y image forming unit 20Y, the M image forming unit 20M and the C image forming unit 20C.

Figure 3:
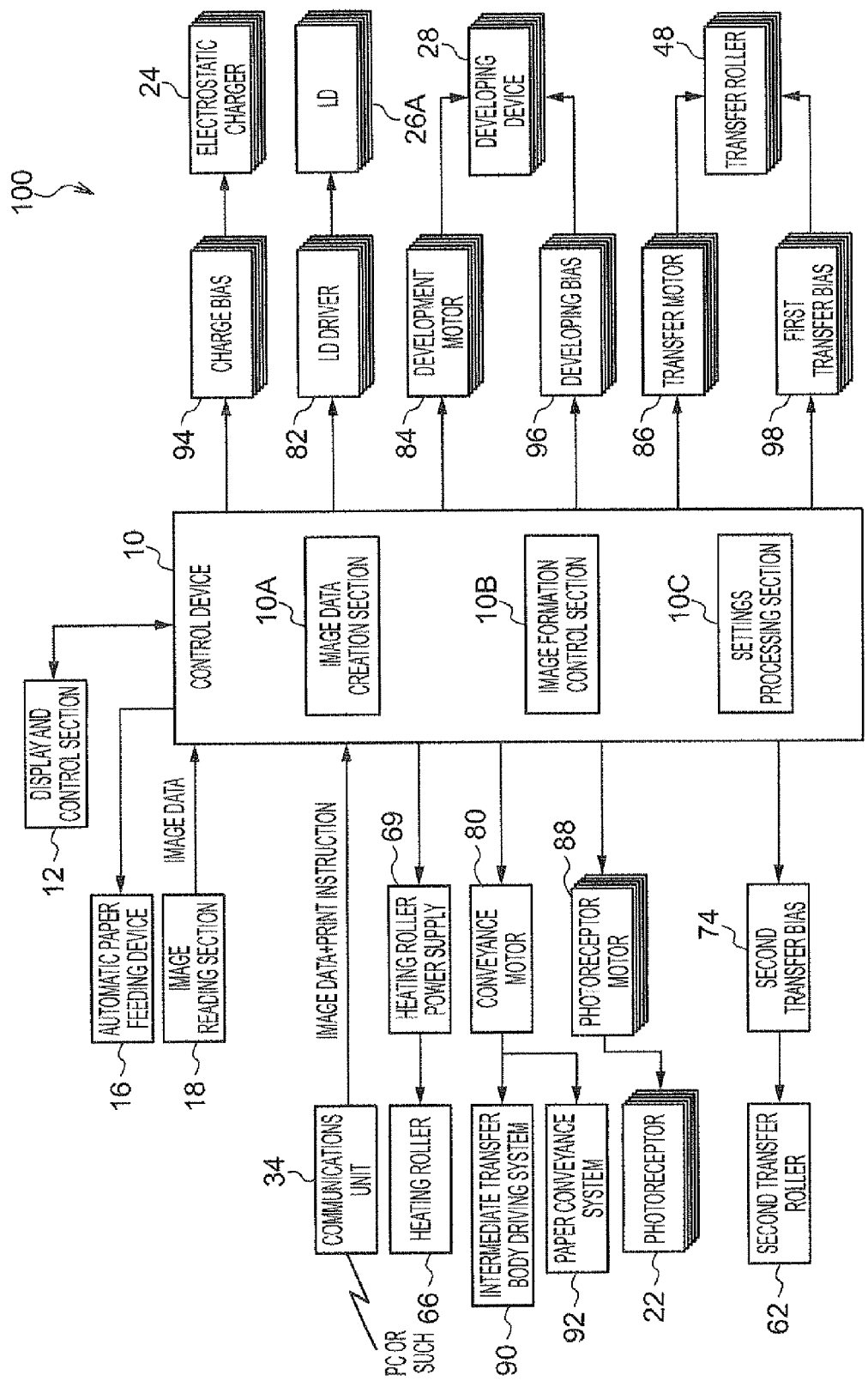
FIG. 3 is a block diagram illustrating structure of a control system of the image forming device relating to the exemplary embodiment.

FIG. 3 is a block diagram illustrating structure of a control system of the image forming device 100. The image reading section is also illustrated in FIG. 3. Hereinafter, where the L image forming unit 20L, the Y image forming unit 20Y, the M image forming unit 20M, the C image forming unit 20C and the K image forming unit 20K are not to be particularly distinguished in the descriptions, the image forming units are simply referred to as the image forming unit(s) 20. Structural elements constituting the respective image forming units 20 and structural elements provided in the image forming device 100 in correspondence with the respective image forming units 20 will also be described with the reference numeral suffixes (Y, M, C, K and L) being omitted.

As illustrated in FIG. 3, in the image forming device 100, a display and control section 12, an automatic paper feeding device 16, an image reading section 18 and a communications unit 34 are each connected to a control device 10.

The display and control section 12 is constituted by, for example, a touch panel display or the like, displays various kinds of information and, by a user touching the display and control section 12 to perform instructions, inputs instructions such as printing instructions and the like and settings such as information on various settings and the like. A display section and a control section may be provided separately.

When a copy instruction is performed from the display and control section 12, the control device 10 reads an original at the image reading section 18. When it is detected that originals have been placed on the automatic paper feeding device 16, the control device 10 operates the automatic paper feeding device 16, guides the originals one sheet at a time onto a platen glass, and reads the originals with the image reading section 18. Image data representing an image recorded at an original is acquired as a result of reading by the image reading section 18. The control device 10 controls the image forming section so as to form an image based on the acquired image data. When a print request is inputted by the display and control section 12 being controlled, the control device 10 controls the image forming section such that an image is formed on the basis of the print request. On occasion, rather than a print request being performed from the display and control section 12, a print request sent from the computer 200 is received through the communications unit 34. The control device 10 controls the image forming section such that an image is formed using the received print request.

Electrical structure of the image forming section of the image forming device 100 will be described.

As illustrated in FIG. 3, the image forming device 100 is provided with a conveyance motor 80, LD drivers 82 for driving illumination of laser diodes (LD) 26A of the exposure devices 26, motors (hereinafter referred to as development motors) 84 for driving the developing devices 28, motors (hereinafter referred to as transfer motors) 86 for driving the transfer rollers 48, and motors (hereinafter referred to as photoreceptor motors) 88 for causing the photoreceptors 22 to rotate. The conveyance motors 80, the LD drivers 82, the development motors 84, the transfer motors 86 and the photoreceptor motors 88 are respectively connected to the control device 10.

The conveyance motor 80 is connected to an intermediate transfer body driving system 90, which is for causing the intermediate transfer belt 42 including the conveyance rollers 44 to rotate, and a paper conveyance system 92, which is for conveying the recording paper. When the conveyance motor 80 is driven, rotary force thereof is transmitted to the intermediate transfer body driving system 90 and the paper conveyance system 92, the intermediate transfer belt 42 is turned in the direction of arrow a shown in FIG. 2, and recording paper is serially conveyed along the conveyance path P from the paper accommodation section 14, through the second transfer unit 6, and to ejection to an ejection section.

The photoreceptor motor 88 is provided at each image forming unit 20, and is connected to the photoreceptor 22 in the respectively corresponding image forming unit 20. When the photoreceptor motor 88 is driven, rotary force thereof is transmitted to the photoreceptor 22, and the photoreceptor 22 is turned in the direction of the a arrow shown in FIG. 2.

The LD driver 82 is provided at each image forming unit 20, and is connected with the LD 26A that is a light source of the exposure device 26 in the respectively corresponding image forming unit 20. Illumination signals corresponding to image data are inputted from the control device 10 to the LD driver 82, and the LD driver 82 turns illumination of the LD 26A on and off in accordance with the inputted illumination signals.

The development motor 84 is provided at each image forming unit 20. In the image forming device 100, when the development motor 84 is turned, rotary force thereof is transmitted to the developing device 28 in the respectively corresponding image forming unit 20, and the developing device 28 is driven.

The transfer motor 86 is provided at each image forming unit 20. By turning of the transfer motor 86 during printing, the transfer roller 48 in the respectively corresponding image forming unit 20 is pressed and touched against the surface of the photoreceptor 22.

The electrostatic chargers 24, the transfer rollers 48, the developing devices 28 and the second transfer roller 62 require high-voltage power supplies. In the image forming device 100, in order to provide these high-voltage power supplies, electrostatic charger bias power supply units (hereinafter referred to as charge bias power supplies) 94, developer bias power supply units (hereinafter referred to as developing bias power supplies) 96, bias power supply units for the transfer rollers 48 (hereinafter referred to as first transfer bias power supplies) 98, and a bias power supply unit for the second transfer roller 62 (hereinafter referred to as a second transfer bias power supply) 74 are each connected to the control device 10.

The charge bias power supply 94 is provided at each image forming unit 20, and is connected to be capable of applying high voltage to the electrostatic charger 24 in the respectively corresponding image forming unit 20. In the image forming device 100, when a high voltage from the charge bias power supply 94 is applied to the electrostatic charger 24, the charging roller that is the electrostatic charger 24 is charged up and the photoreceptor 22 is charged up by this charging roller.

The developing bias power supply 96 is provided at each image forming unit 20, and is connected to be capable of applying high voltage to the developing device 28 in the respectively corresponding image forming unit 20. In the image forming device 100, when a high voltage from the developing bias power supply 96 is applied to the developing device 28, toner inside the developing device 28 is charged up, and the toner is electrostatically adhered to and develops a latent image portion of the photoreceptor 22.

The first transfer bias power supply 98 is provided at each image forming unit 20, and is connected to be capable of applying high voltage to the transfer roller 48 in the respectively corresponding image forming unit 20. In the image forming device 100, when a high voltage from the first transfer bias power supply 98 is applied to the transfer roller 48, the transfer roller 48 is charged up, and the toner image on the photoreceptor 22 is electrostatically transferred onto the intermediate transfer belt 42.

The second transfer bias power supply 74 is connected to be capable of applying high voltage to the second transfer roller 62. In the image forming device 100, when a high voltage from the second transfer bias power supply 74 is applied to the second transfer roller 62, the second transfer roller 62 is charged up and a toner image on the intermediate transfer belt 42 is electrostatically transferred to recording paper.

A heating roller power supply 69 is connected to the control device 10. The heating roller power supply 69 provides power for heating the heating roller 66 to a heat-generating body provided inside the heating roller 66.

In order to control operations of the image forming section, the control device 10 is equipped with the functions of an image data creation section 10A, an image formation control section 10B that controls image formation operations, and a settings processing section 10C.

The image data creation section 10A analyzes print information and creates image data for use in image formation at the image forming section.

The image formation control section 10B controls image formation operations of the image forming section by controlling driving of the conveyance motors 80, the LD drivers 82, the development motors 84, the transfer motors 86 and the photoreceptor motors 88, and on/off switching or applied voltage levels and the like of the charge bias power supplies 94, the developing bias power supplies 96, the first transfer bias power supplies 98 and the second transfer bias power supply 74.

The settings processing section 10C acquires synthesis conditions when plural images that include colored portions are to be synthesized and conditions of formation of transparent images, and memorizes and sets the same in a pre-specified memory unit such as, for example, a memory region of a later-described RAM 71 or the like. Details of the synthesis conditions and formation conditions are described hereafter.

Figure 4:
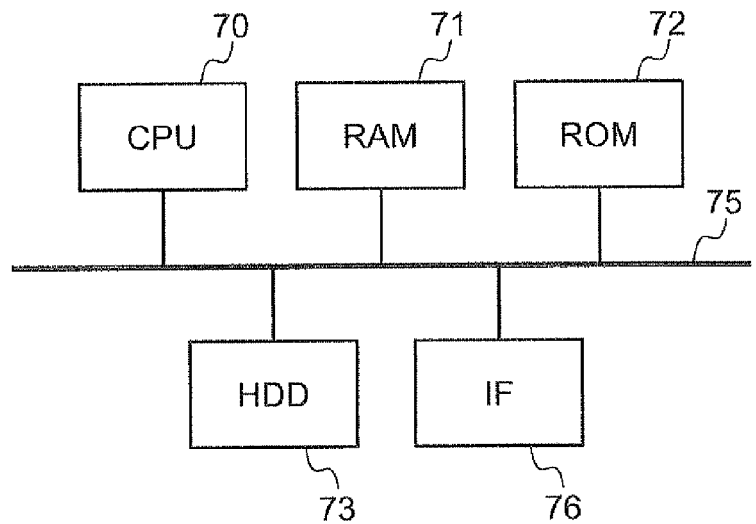
FIG. 4 is a diagram illustrating an example of hardware structure of a control device.

FIG. 4 is a diagram illustrating an example of hardware structure of the control device 10.

The control device 10 of the present exemplary embodiment is constituted by a central processing unit (CPU) 70, random access memory (RAM) 71, read only memory (ROM) 72, a hard disk drive (HDD) 73 and an interface (I/F) 76 being connected via a bus 75.

The CPU 70 executes programs stored in the ROM 72 and HDD 73 (including programs of processing routines that are described hereafter), and controls overall operations of the image forming device 100. Programs that the CPU 70 executes, data required for processing at the CPU 70 and the like are stored in the ROM 72. The RAM 71 is used as a working memory. The above-mentioned image data creation section 10A, image formation control section 10B and settings processing section 10C are functions that are realized by the CPU 70 executing programs.

Memory mediums for storing programs executed by the CPU 70 are not to be limited to the HDD 73 and the ROM 72. For example, flexible discs, DVDs, magneto-optical discs, USB memories and the like (not shown) are possible, and other storage devices connected to the communications unit 150 are possible.

The HDD 73 stores programs to be executed by the CPU 70, various kinds of data and so forth. The HDD 73 also stores information on a dither matrix that is used when creating image data to be used in image formation at the image forming section, and suchlike.

The I/F 76 is an interface that is connected to the display and control section 12, the automatic paper feeding device 16, the image reading section 18, the communications unit 34, the conveyance motor 80, the LD drivers 82, the development motors 84, the transfer motors 86, the photoreceptor motors 88, the first transfer bias power supplies 98, the second transfer bias power supply 74 and the heating roller power supply 69.

Figure 5:
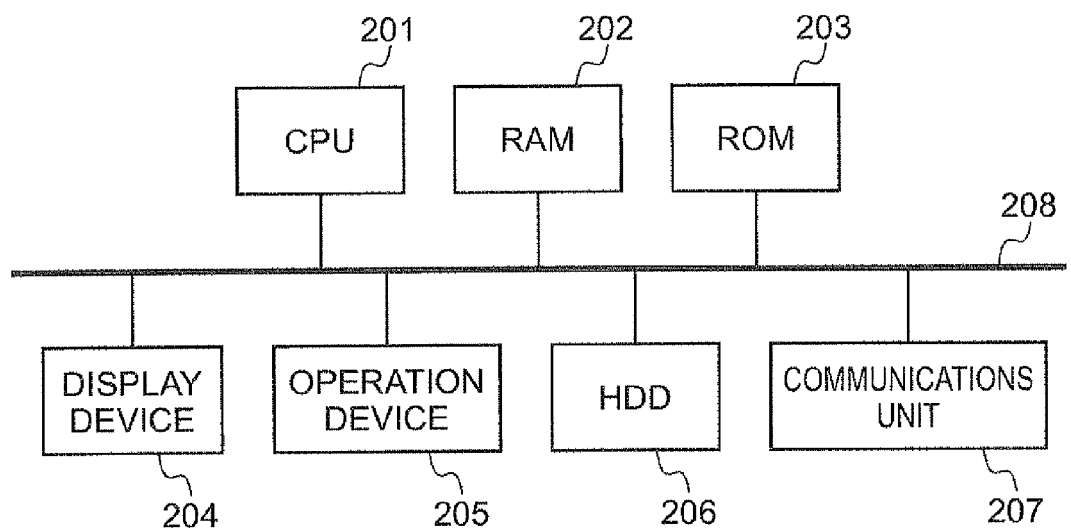
FIG. 5 is a diagram illustrating an example of hardware structure of the computer.

FIG. 5 is a diagram illustrating an example of hardware structure of the computer 200.

The computer 200 of the present exemplary embodiment is structured by a central processing unit (CPU) 201, random access memory (RAM) 202, read only memory (ROM) 203, a display device 204, a operation device 205, a hard disk drive (HDD) 206 and a communications unit 207 being connected via a bus 208.

The CPU 201 executes programs stored in the ROM 203 and the HDD 206, and controls overall operations of the computer 200. Programs that the CPU 201 executes (for example, a program for creating printing information for printing image data that has been created by application software and sending the printing information to the image forming device 100, and suchlike), data required for processing at the CPU 201 and the like are stored in the ROM 203. The RAM 202 is used as a working memory.

Memory mediums for storing programs executed by the CPU 201 are not to be limited to the HDD 206 and the ROM 203. For example, flexible discs, DVDs, magneto-optical discs, USB memories and the like (not shown) are possible, and other storage devices connected to the communications unit 150 are possible.

The display device 204 is constituted by, for example, a liquid crystal display and the like, and displays various kinds of images, messages and the like under the control of the CPU 201.

The operation device 205 is constituted by, for example, a keyboard and mouse or the like. Various kinds of information are inputted by a user operating the operation device 205.

The HDD 206 stores programs to be executed by the CPU 201 and various kinds of data. The communications unit 207 is an interface for sending and receiving data to and from other devices via the communications unit 150.

Operations at the image forming device 100 when forming an image in which plural images with respective colored portions are superimposed (hereinafter referred to as a synthesized image) will be described. For the present exemplary embodiment, a case in which forms and data with respective colored portions are superimposed and synthesized is given as an example and described. Forms are fixed images that have been registered in advance. Data is images prepared in order to be superimposed with forms, which images are alterable images. In the present exemplary embodiment, a case is described in which a user operates the display and control section 12 of the image forming device 100 and sets synthesis conditions for when synthesizing plural images and formation conditions for transparent images.

Figure 6:
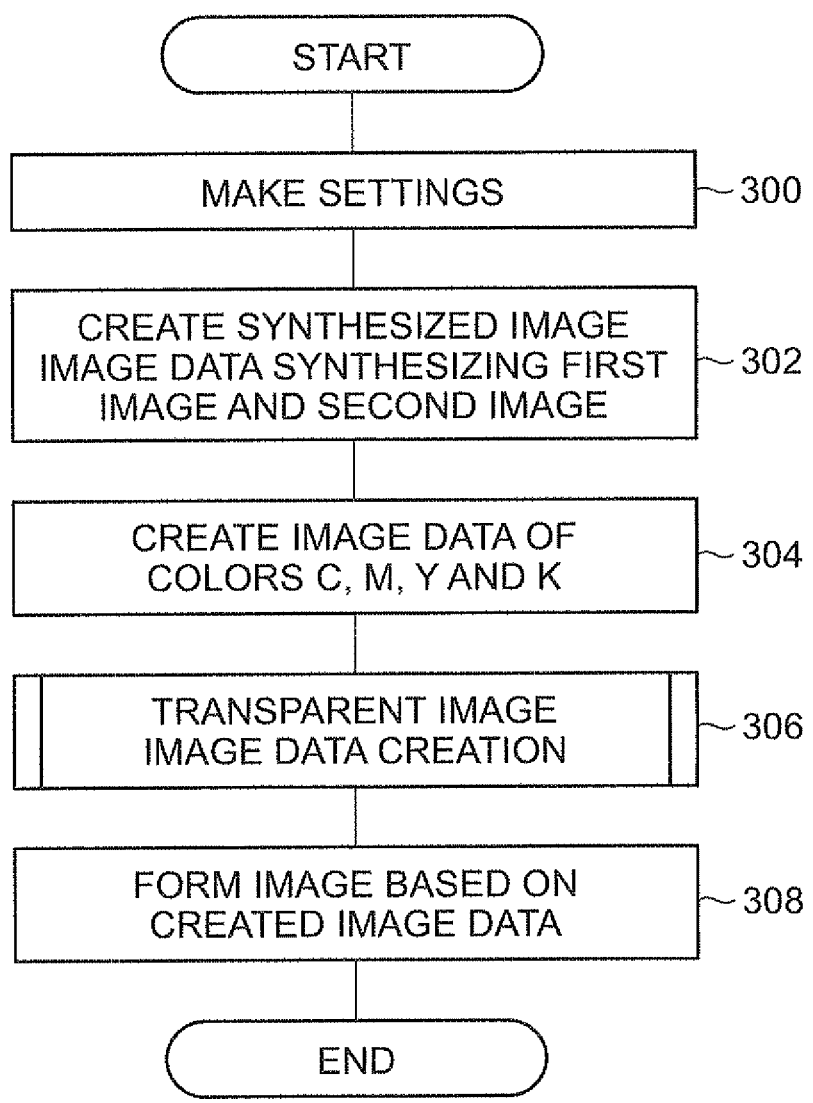
FIG. 6 is a flowchart showing the flow of a processing routine of an image formation control program.

When a print request specifying a form and data is received, the processing routine of the image formation processing program illustrated in FIG. 6 is executed.

In step 300, synthesis conditions when synthesizing plural images with colored portions (hereinafter referred to as the synthesis conditions) and formation conditions for transparent images (hereinafter referred to as the formation conditions) are set. Herebelow, this setting is described in more detail.

Figure 8:
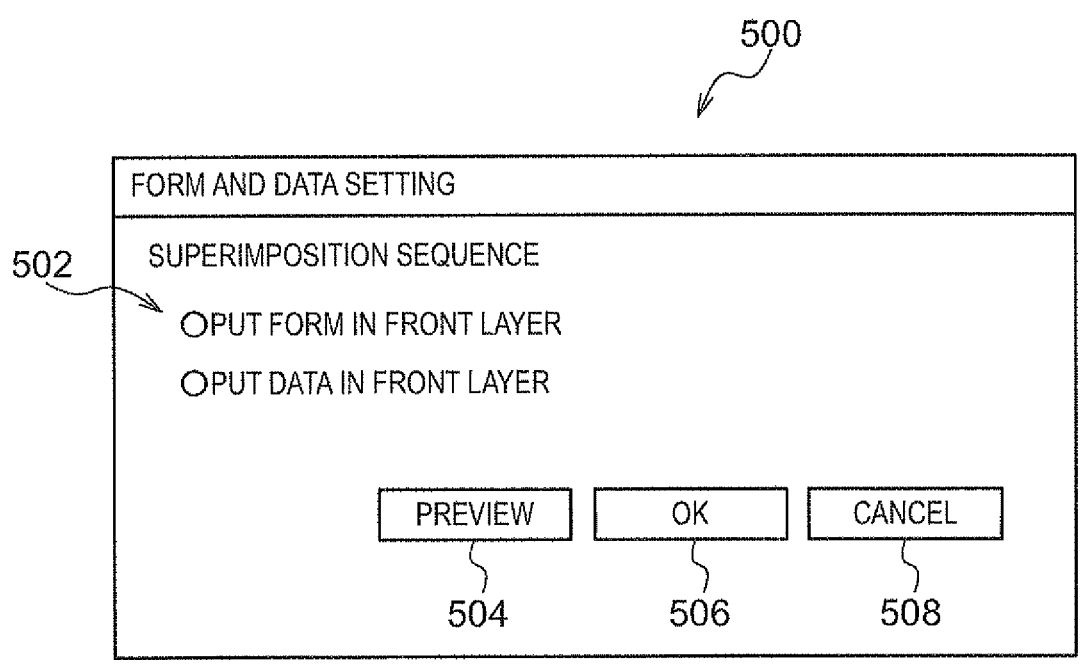
FIG. 8 is a view illustrating an example of a first settings screen for setting synthesis conditions when synthesizing plural images.

The settings processing section 10C displays a first settings screen 500 for setting the synthesis conditions at the display and control section 12. FIG. 8 is a view illustrating an example of the first settings screen 500 for setting the synthesis conditions.

In this first settings screen 500, a user specifies a sequence for superimposing forms and data (a superimposition sequence). This superimposition sequence corresponds to the aforementioned synthesis conditions for when synthesizing forms and data. Here, as illustrated at radio buttons 502, either of "Put form in front layer" and "Put data in front layer" is specified. The term layer refers to lamination. At a time of synthesis, the forms and data are notionally synthesized by being superimposed in a lamination. The term front layer (front level) means a layer (level) that is disposed on top when two images are notionally superimposed in the lamination, and the term rear layer (rear level) means the layer (level) that is disposed underneath. In a region in which a colored portion of a front layer and a colored portion of a rear layer are superimposed, the front colored portion is visible but the rear colored portion is concealed by the front colored portion and is not visible. Thus, when synthesizing in practice, where there is a region at which respective colored portions of a front layer and a rear layer are superimposed, the front layer colored portion is selected as the image at this region and used in the synthesized image (see FIG. 12 and FIG. 13).

When "Put form in front layer" is specified, synthesis is performed by superimposing a form on data with the form as the front layer and the data as the rear layer. That is, when synthesizing the data with the form, where there is a region at which colored portions in the data and the form are superimposed, the colored portion of the form is selected as the image in this region. On the other hand, when "Put data in front layer" is specified, synthesis is performed by superimposing data on a form with the data as the front layer and the form as the rear layer. That is, when synthesizing the data with the form, where there is a region at which colored portions in the data and the form are superimposed, the colored portion of the data is selected as the image in this region.

If a preview button 504 is pressed after the superimposition sequence has been specified, a preview screen of a synthesized image in which data and a form are synthesized in accordance with the specification is displayed at the display and control section 12.

If an OK button 506 is pressed after the superimposition sequence has been specified, the data and form synthesis condition is stored in the pre-specified region and set. If a cancel button 512 is pressed, the specification of the superimposition sequence is cancelled.

Figure 9:
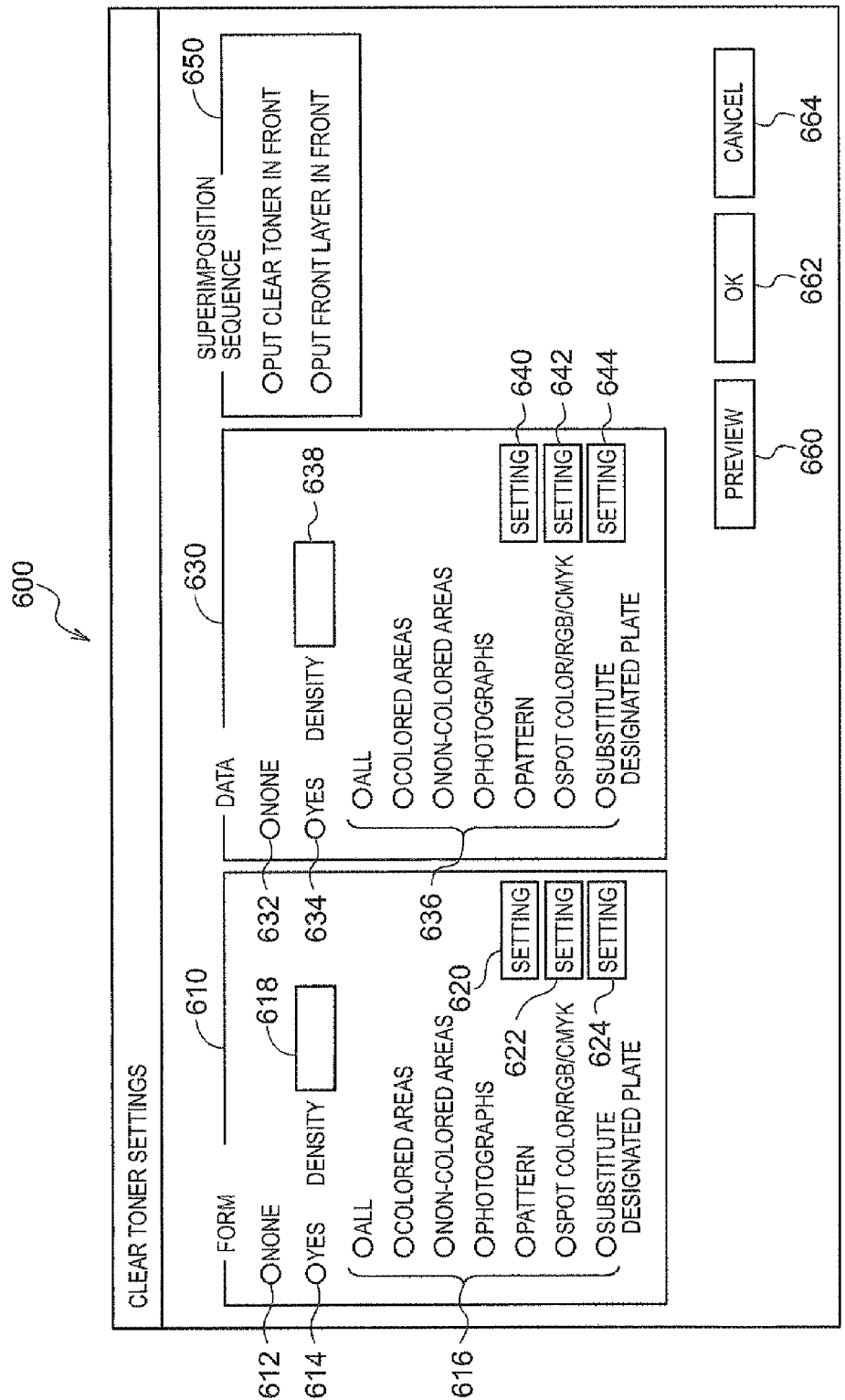
FIG. 9 is a view illustrating an example of a second settings screen for setting transparent image formation conditions.

FIG. 9 is a view illustrating an example of a settings screen for setting the transparent image formation conditions (hereinafter referred to as a second settings screen 600). The second settings screen 600 includes three areas 610, 630 and 650.

In the area 610, whether or not a transparent image is to be superimposed with a form is specified and, if it is, a superimposition region is specified. In the area 630, whether or not a transparent image is to be superimposed with data is specified and, if it is, a superimposition region is specified. In the area 650, a sequence for superimposing each of the transparent image(s), the form and the data (a superimposition sequence) is specified.

If a transparent image is not to be superimposed in the layer above a form, "None" 612 is specified in the area 610. If a transparent image is to be superimposed in a layer above a form, "Yes" 614 is specified. If "Yes" 614 is specified (i.e., if the transparent image is to be superimposed on the form), a region of superimposing the transparent image is specified at radio buttons 616. Herein, any of the following is designated to specify the region of superimposing the transparent image (in practice, a region in which clear toner is to be applied).

All
Colored areas
Non-colored areas
Photographs
Pattern
Spot (specific) color
Substitute designated plate (component)

If the transparent image is to be superimposed with the whole of a form, "All" is selected. If the transparent image is to be superimposed with a colored portion in the form, "Colored areas" is selected. If the transparent image is to be superimposed with a non-colored portion in the form, "Non-colored areas" is selected. If the transparent image is to be superimposed with a region in the form at which a photograph/photographs is/are disposed, "Photographs" is selected.

If the transparent image is to be superimposed on the form in a pre-registered pattern, "Pattern" is selected. When a user presses a setting button 620 that corresponds with "Pattern", a list of registered patterns is displayed at the display and control section 12, and the user selects which pattern the transparent image is to be superimposed in.

If the transparent image is to be superimposed on the form at areas at which a particular color is provided, "Spot color" is selected. When a user presses a setting button 622 that corresponds with "Spot color", a setting screen for specifying values of the colors R, G and B or values of the colors C, M, Y and K is displayed, and the particular color is specified by setting the color values. For example, if red (R) is to be specified, numerical values such as R: 100%, G: 0%, B: 0% are set.

If the transparent image is to be superimposed on a region at which one of the colors C, M, Y and K that are generated when printing the form is to be formed, "Substitute designated plate" is selected. When a user selects "Substitute designated plate", a settings screen for specifying (image data of) one of the plates C, M, Y and K is displayed when a setting button 624 that corresponds with "Substitute designated plate" is pressed, and one of C, M, Y and K is specified. Hence, image data of this specified color is used as image data of the transparent image to be superimposed on the form.

In the present exemplary embodiment, when a transparent image is to be superimposed on a form, a density 618 of the superimposed transparent image is also specified. The meaning of the term "density of the transparent image" includes a halftone area ratio of the transparent image. Here, the density of a region in which clear toner is applied in practice is set to a numerical value between 0 and 100%. A gradation value may also be set as a numerical value representing density. For example, if the density is represented by an eight bit gradation level, any gradation value between 0 and 255 is specified. A level of reflection, a state of glossiness or the like corresponding to the density of the transparent image is also altered. For example, the higher the density, the higher the proportion of reflected light relative to incident light and the higher the glossiness (for example, a degree of glossiness measured with 60° measurements or the like).

If a transparent image is not to be superimposed on the data, "None" 632 is selected in the area 630. If a transparent image is to be superimposed in a layer above the data, "Yes" 634 is selected. If "Yes" 634 is selected (i.e., if the transparent image is to be superimposed on the data), a region of superimposing the transparent image is specified at radio buttons 636 and a density is specified in a text box 638. Specifications of the superimposition region and the density are the same as for forms so will not be described.

If "Yes" 614 is specified in the area 610 and/or "Yes" 634 is specified in the area 630, then the user specifies a sequence of superimposing the images by specifying either of "Put clear toner in front" or "Put front layer in front" in the area 650.

Hereinafter, whichever image of the form and the data is set to the front layer in the first settings screen 500 is referred to as a first image, and the image that is set to the rear layer is referred to as a second image. A transparent image that is superimposed on the first image is referred to as a first transparent image, and a transparent image that is superimposed on the second image is referred to as a second transparent image. A region in which the first transparent image is superimposed is referred to as a first transparent image region, and a region in which the second transparent image is superimposed is referred to as a second transparent image region.

Now, because the first image is an image that is (notionally) disposed frontmost among a plural number of images with colored portions, even though not specified, the first transparent image superimposing the first image is set to be the frontmost image among the respective images.

A second transparent image that is to be superimposed in front of (in the layer above) the second image may be superimposed behind (in the layer below) the first transparent image and thus in front of (in the layer above) the first image (see FIG. 11 and FIG. 16), or may be superimposed behind (in the layer below) the first image and thus in front of (in the layer above) the second image (see FIG. 13 and FIG. 18).

When "Put clear toner in front" is specified in the area 650, the second transparent image is notionally superimposed behind (in the layer below) the first transparent image and thus in front of (in the layer above) the first image. When "Put front layer in front" is specified in the area 650, the second transparent image is notionally superimposed behind (in the layer below) the first image and thus in front of (in the layer above) the second image.

If a preview button 660 is pressed after the transparent image formation conditions have been specified as described above, a preview screen of an image in which a synthesized image in which the data and the form are synthesized and transparent images on the synthesized image are superimposed as specified is displayed at the display and control section 12.

If an OK button 662 is pressed after the transparent image formation conditions have been specified as described above, the formation conditions are stored in the pre-specified region and set. If a cancel button 664 is pressed after the transparent image formation conditions have been specified as described above, the specification is cancelled.

After the setting in step 300 of FIG. 6, in step 302, the image data creation section 10A creates image data of a synthesized image in which the first image and the second image are synthesized. Specifically, image data of respective multi-level bitmaps of the first image and the second image is synthesized in accordance with the synthesis conditions that have been set as described above.

Examples of a first image and a second image are illustrated in the top rows of FIG. 10 and FIG. 15. Synthesized images of this first image and second image are illustrated at the left sides of the top rows of FIG. 12 and FIG. 14. As can be seen from these images, at a region at which the colored portions in the first image and the second image are superimposed, the first image at the front is used.

In step 304, the image data creation section 10A creates binary image data for the colors C, M, Y and K from image data representing the above synthesized image. If the image data representing the synthesized image is not image data for the colors C, M, Y and K (for example, image data for the colors R, G and B), respective multi-level image data of R, G and B is converted to multi-level image data of the respective colors C, M, Y and K, and then the CMYK multi-level image data is subjected to binarization processing using a dither matrix. Thus, binary image data for the colors C, M, Y and K is created. If the image data representing the above synthesized image is image data for the colors C, M, Y and K, binarization processing is applied to create binary image data for the colors C, M, Y and K.

In step 306, the image data creation section 10A creates image data of transparent images based on the transparent image formation conditions set as described above.

Figure 7:
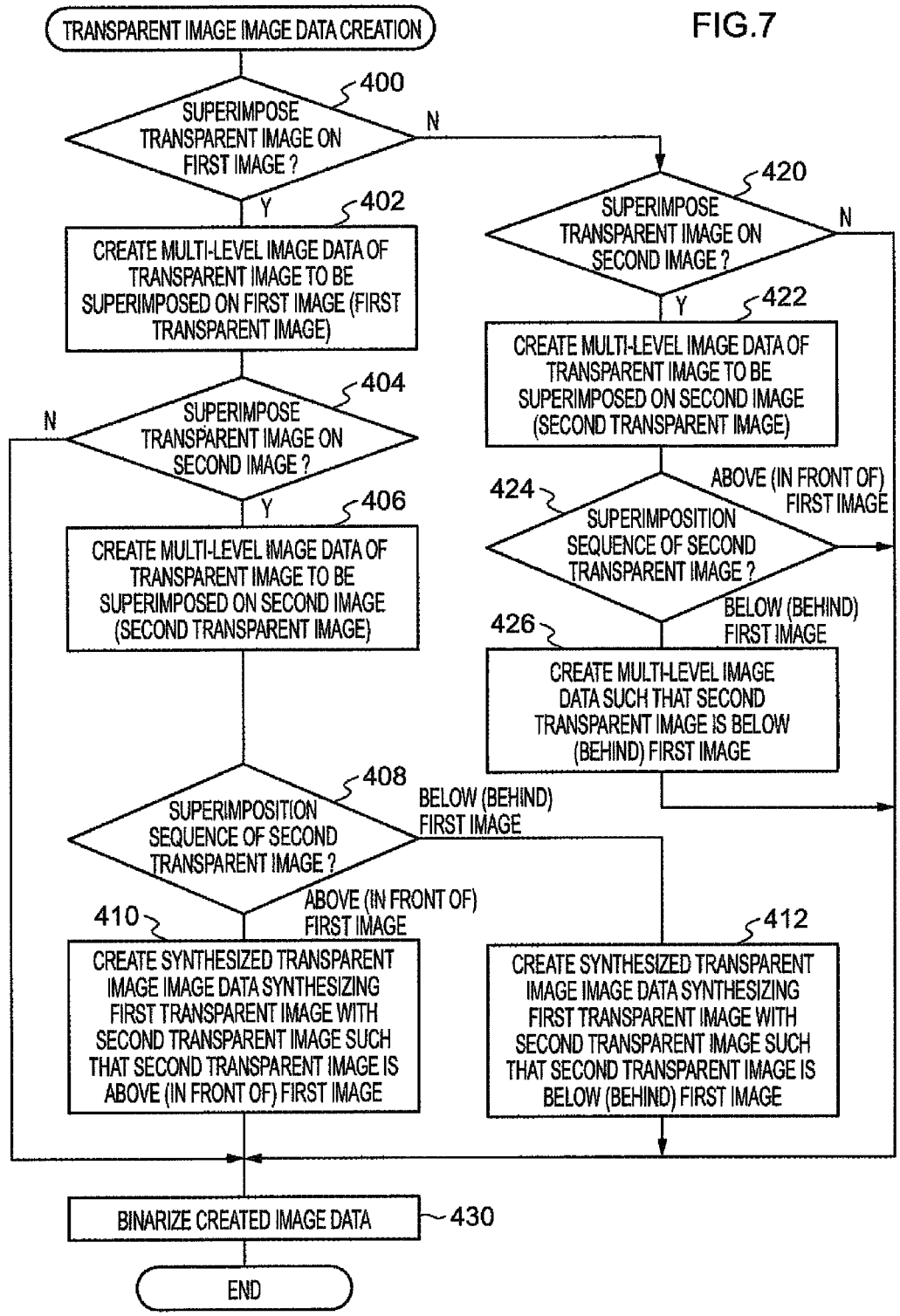
FIG. 7 is a flowchart showing the flow of a creation processing routine that creates image data of (a) transparent image(s).

FIG. 7 is a flowchart showing the flow of a creation processing routine that creates transparent image image data.

In step 400, the image data creation section 10A determines whether or not superimposing a transparent image on the first image has been set.

If the determination in step 400 is positive, then in step 402 the image data creation section 10A creates image data for forming the first transparent image in accordance with the settings for the first transparent image region and density. Specifically, image data of the first transparent image is created by creating multi-level image data such that the density is zero outside the first transparent image region while the first transparent image region is at the set density.

In step 404, the image data creation section 10A determines whether or not superimposing a transparent image on the second image has been set.

If the determination in step 404 is positive, then in step 406 the image data creation section 10A creates image data for forming the second transparent image in accordance with the settings for the second transparent image region and density. Specifically, image data of the second transparent image is created by creating multi-level image data such that the density is zero outside the second transparent image region while the second transparent image region is at the set density.

In step 408, the image data creation section 10A checks the setting of the superimposition sequence of each of the transparent images and the plural images including the colored portions, and determines whether the second transparent image is to be superimposed before (above) the first image or superimposed after (below) the same.

Figure 11:
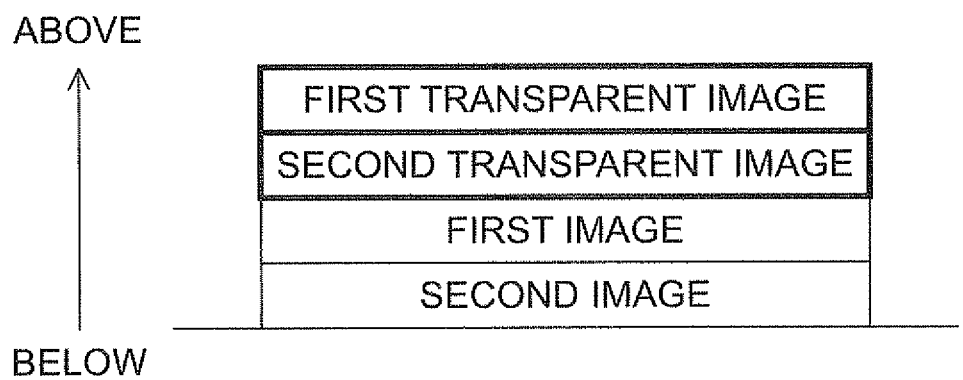
FIG. 11 is a diagram illustrating an example of a sequence in which the respective images illustrated in FIG. 10 are superimposed.

If the specification "Put clear toner in front" has been set in the area 650, each of the transparent images and the images including the colored portions are notionally superimposed in the superimposition sequence shown in FIG. 11. In step 410, the image data creation section 10A creates (multi-level) image data of a synthesized transparent image in which the first transparent image and the second transparent image are synthesized such that the second transparent image will be above (in front of) the first image. In this superimposition sequence, the first transparent image and the second transparent image are consecutively superimposed (with no image including a colored portion being sandwiched therebetween). Densities of respective pixels in each of the first transparent image and the second transparent image are added together to create the synthesized transparent image image data. Therefore, the density of a region in which the first transparent image region and the second transparent image region coincide is a density for which the density of the first transparent image and the density of the second transparent image are added together.

Examples of a first transparent image and a second transparent image are shown in the bottom row of FIG. 10. The regions in which diagonal lines are enclosed by heavy lines are the first and second transparent image regions. In this example, the region of the colored portion of the first image serves as the first transparent image region, and the region of the colored portion of the second image serves as the second transparent image region. A synthesized transparent image when the first transparent image and the second transparent image are superimposed in the superimposition sequence shown in FIG. 11 and synthesized is illustrated at the right side of the top row of FIG. 12. The density of a region at which the first transparent image region and the second transparent image region coincide, at which a density 50% of the first transparent image and a density 50% of the second transparent image are added, is 100%.

If the specification "Put front layer in front" has been set in the area 650, each of the transparent images and the images including the colored portions are notionally superimposed in the superimposition sequence shown in FIG. 13. In step 412, the image data creation section 10A creates (multi-level) image data of a synthesized transparent image in which the first transparent image and the second transparent image are synthesized such that the second transparent image will be in the layer below (behind) the first image.

Figure 14:
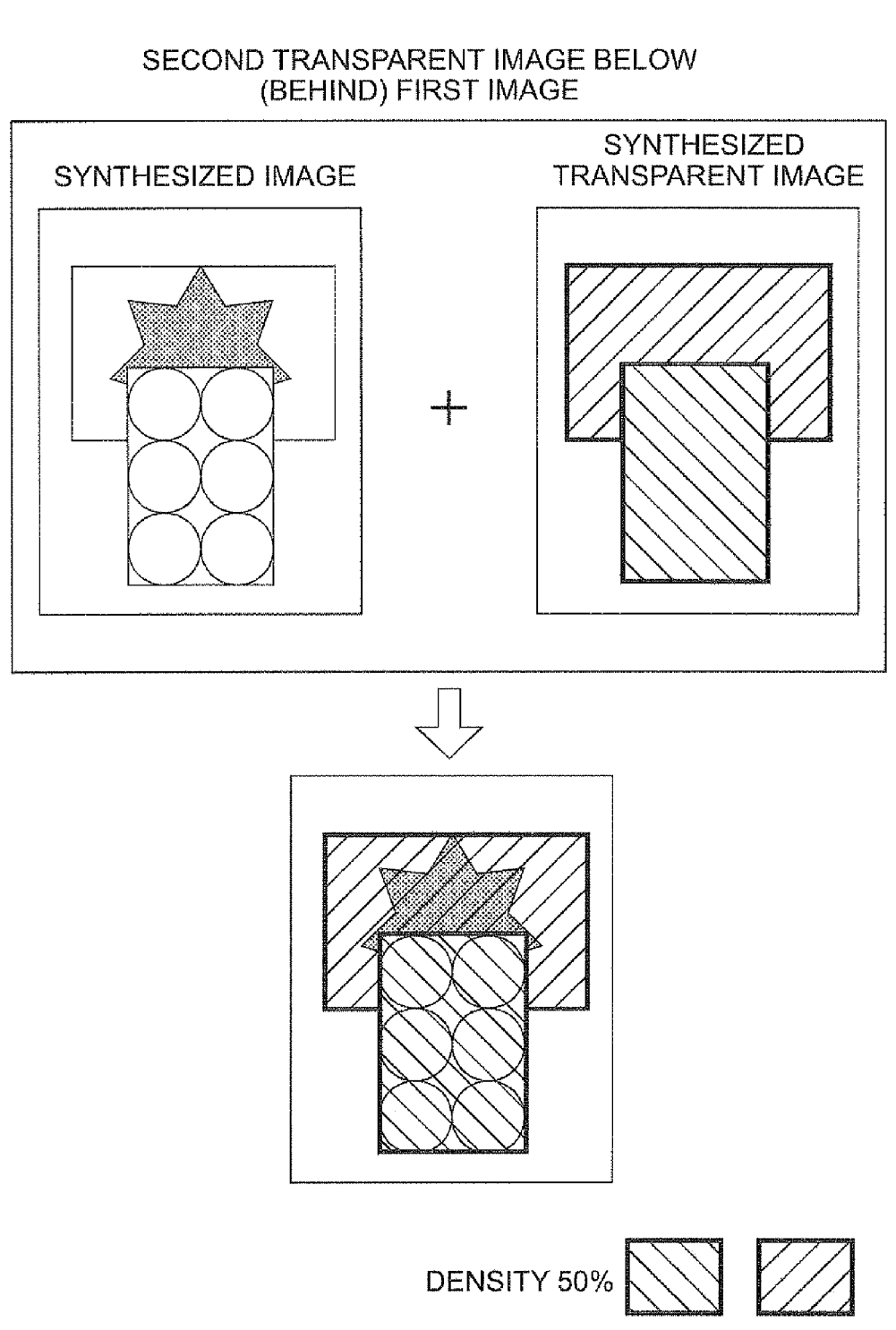
FIG. 14 is a diagram illustrating formation results when an image is formed by superimposing the respective images illustrated in FIG. 10 in the sequence illustrated in FIG. 13.

A synthesized transparent image when the first transparent image and the second transparent image shown in FIG. 10 are superimposed in the superimposition sequence shown in FIG. 13 and synthesized is illustrated at the right side of the top row of FIG. 14. The density of a region at which the first transparent image region and the second transparent image region coincide is the density of the first transparent image (50%). If the images are notionally superimposed as shown in FIG. 13 and this image is notionally viewed from the front, where the second transparent image is disposed behind the colored portion of the first image, the second transparent image is hidden by the colored portion of the first image and is not visible. Thus, the image data of the synthesized transparent image is created such that the second transparent image is formed at a region that is the second transparent image region from which a region that coincides with the colored portion of the first image is subtracted, and the second transparent image is not formed in other regions.

When the image data creation section 10A has created the image data of the synthesized transparent image in step 410 or step 412, the synthesized transparent image image data is binarized in step 430. This image data is used when the L image forming unit 20L forms the transparent image.

If the determination in step 400 is negative, then in step 420, the image data creation section 10A determines whether or not superimposing a transparent image on the second image has been set.

If the determination in step 420 is positive, then in step 422 the image data creation section 10A creates image data for forming the second transparent image in accordance with the settings for the second transparent image region and density. When the determination in step 400 is negative and the determination in step 420 is positive, the first transparent image is not to be formed. Therefore, as illustrated in the bottom row of FIG. 15, only image data for the second transparent image is created.

In step 424, the image data creation section 10A checks the setting of the superimposition sequence of each of the transparent image and the plural images including the colored portions, and determines whether the second transparent image is to be superimposed before (above) the first image or superimposed after (below) the same.

Figure 16:
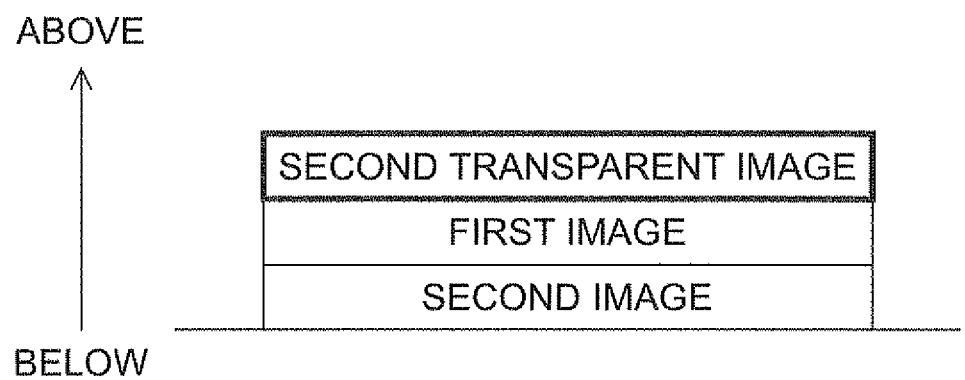
FIG. 16 is a diagram illustrating an example of a sequence in which the respective images illustrated in FIG. 15 are superimposed.
Figure 17:
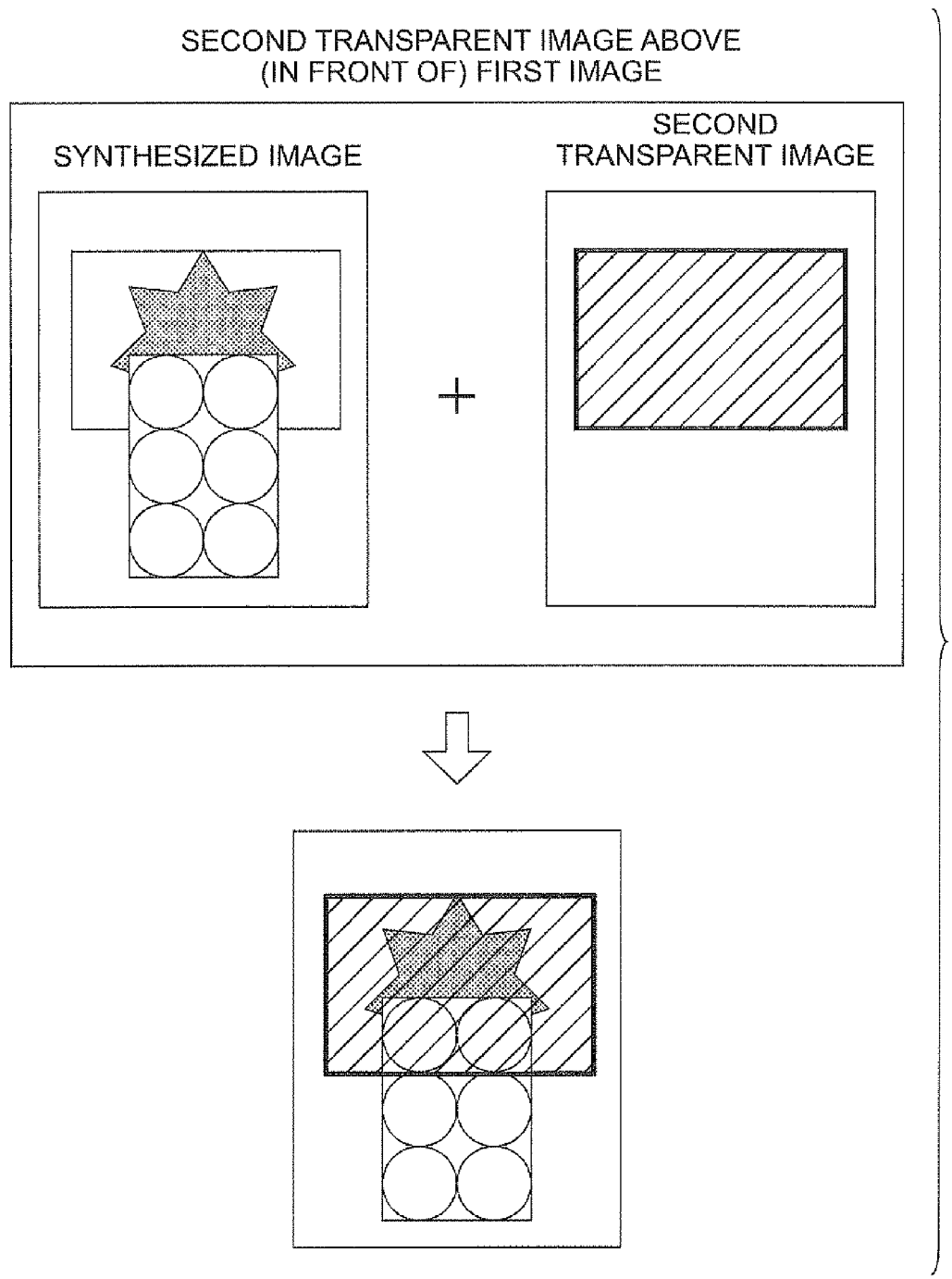
FIG. 17 is a diagram illustrating formation results when an image is formed by superimposing the respective images illustrated in FIG. 15 in the sequence illustrated in FIG. 16.

If the specification "Put clear toner in front" has been set in the area 650, each of the transparent image and the images including the colored portions are notionally superimposed in the superimposition sequence shown in FIG. 16. Therefore, step 426 is skipped (i.e., image data of the second transparent image that has been created in step 422 is not modified), and the processing advances to step 430. That is, multi-level image data for forming the transparent image in the second transparent image region, as illustrated at the right side of the top row of FIG. 17, is subjected to binarization processing in step 430 and used as is.

Figure 18:
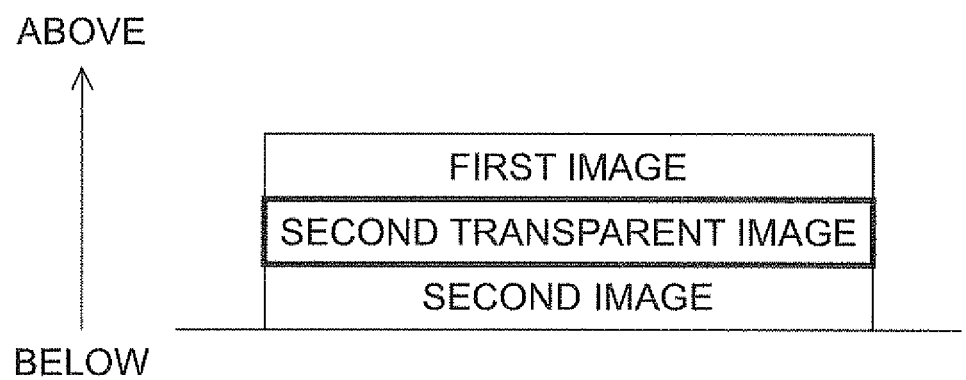
FIG. 18 is a diagram illustrating an example of a sequence in which the respective images illustrated in FIG. 15 are superimposed.

If the specification "Put front layer in front" has been set in the area 650, each of the transparent image and the images including the colored portions are notionally superimposed in the superimposition sequence shown in FIG. 18. Therefore, in step 426, the image data creation section 10A creates image data in which the above-created image data of the second transparent image is modified (corrected) such that the second transparent image is in the layer below (behind) the first image (see the right side of the top row of FIG. 19). That is, the image data of the second transparent image is modified such that the transparent image is formed (clear toner is applied) at a region that is the second transparent image region from which a region that coincides with the colored portion of the first image is subtracted, and the processing advances to step 430.

In step 430, the image data creation section 10A binarizes the image data of the second transparent image. This image data is used when the L image forming unit 20L forms the transparent image.

If the determination in step 400 is positive and the determination in step 404 is negative, the first transparent image is to be formed but the second transparent image is not to be formed. In this case, regardless of the setting in the area 650, the respective transparent image and colored images are nationally superimposed in a sequence which is not illustrated but in which the second transparent image is removed from the superimposition sequence shown in FIG. 11. Therefore, there is no need to synthesize the image data of the first transparent image with the image data of the second transparent image. Furthermore, because the first transparent image is superimposed frontmost, there is no need to modify it as in step 426. Thus, the processing simply proceeds to step 430.

In step 430, the image data creation section 10A binarizes the above-created image data of the first transparent image. This image data will be used when the L image forming unit 20L forms the transparent image.

After the transparent image image data has been created as described above, in step 308 the image formation control section 10B controls the image forming section so as to form an image on the basis of the image data of the colors C, M, Y and K of the synthesized image created in step 304 and the image data of the transparent image created in step 306. If the determinations of step 400 and step 420 are negative, the transparent image image data is not created. Accordingly, only the synthesized image is formed in step 308.

Results of a specific example of image formation, which is described in FIG. 10 to FIG. 19, are summarized and described.

If it is set that the first transparent image should be superimposed on the first image shown in the top row of FIG. 10 at the first transparent image region shown in the bottom row of FIG. 10 and set that the second transparent image should be superimposed on the second image shown in the top row of FIG. 10 at the second transparent image region shown in the bottom row of FIG. 10, then if the superimposition sequence shown in FIG. 11 is set, the synthesized image and the synthesized transparent image are formed as shown in the top row of FIG. 12, and an image is finally formed in which the synthesized transparent image is superimposed on the synthesized image as illustrated in the bottom row of FIG. 12. As shown in FIG. 12, the density of the transparent image at an area at which the first transparent image region coincides with the second transparent image region is a density for which the density of the first transparent image and the density of the second transparent image are added together.

When it is set that the first transparent image should be superimposed on the first image shown in the top row of FIG. 10 at the first transparent image region shown in the bottom row of FIG. 10 and set that the second transparent image should be superimposed on the second image shown in the top row of FIG. 10 at the second transparent image region shown in the bottom row of FIG. 10, if the superimposition sequence shown in FIG. 13 is set, the synthesized image and the synthesized transparent image are formed as shown in the top row of FIG. 14, and an image is finally formed in which the synthesized transparent image is superimposed on the synthesized image as illustrated in the bottom row of FIG. 14. As illustrated in FIG. 14, the density of the transparent image at an area at which the region of the colored portion of the first image coincides with the second transparent image region is the density of the first transparent image.

If it is set that no transparent image should be superimposed on the first image shown in the top row of FIG. 15 as shown in the bottom row of FIG. 15 and set that the second transparent image should be superimposed on the second image shown in the top row of FIG. 15 at the second transparent image region shown in the bottom row of FIG. 15, then if the superimposition sequence shown in FIG. 16 is set, the synthesized image and the second transparent image are formed as shown in the top row of FIG. 17, and an image is finally formed in which the transparent image is superimposed on the synthesized image as illustrated in the bottom row of FIG. 17.

Figure 19:
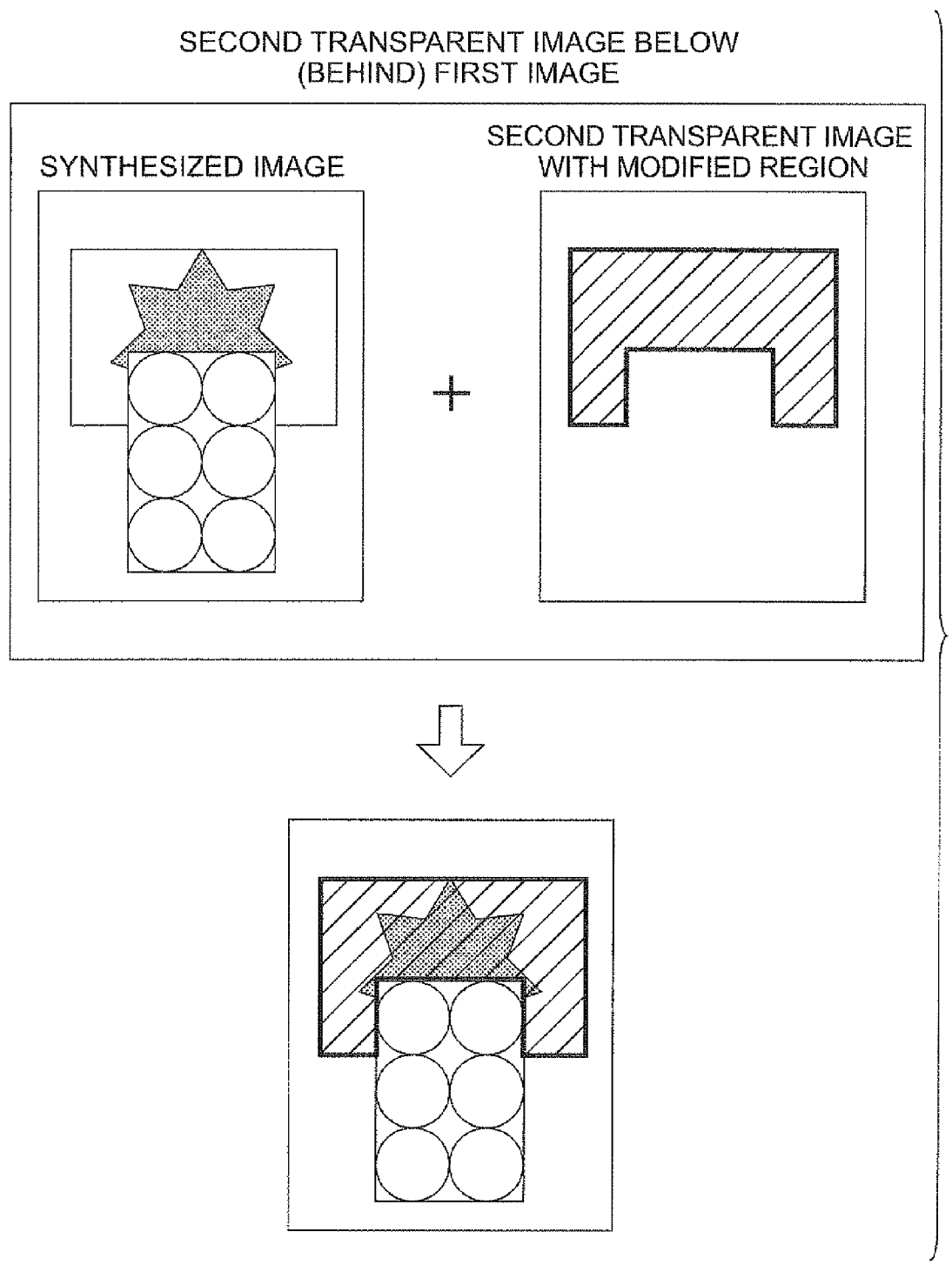
FIG. 19 is a diagram illustrating formation results when an image is formed by superimposing the respective images illustrated in FIG. 15 in the sequence illustrated in FIG. 18.

When it is set that no transparent image should be superimposed on the first image shown in the top row of FIG. 15 as shown in the bottom row of FIG. 15 and set that the second transparent image should be superimposed on the second image shown in the top row of FIG. 15 at the second transparent image region shown in the bottom row of FIG. 15, if the superimposition sequence shown in FIG. 18 is set, the synthesized image and the second transparent image are formed as shown in the top row of FIG. 19, and an image is finally formed in which the transparent image is superimposed on the synthesized image as illustrated in the bottom row of FIG. 19. As illustrated in FIG. 19, the transparent image is not formed at a region at which the colored portion of the first image coincides with the second transparent image region.

In the present exemplary embodiment, a case in which the plural images including respective color portions that are to be superimposed and synthesized are two images—a form and data—is given as an example and described, but this is not to be limiting. For example there may be three or more images. In such a case too, similarly to the above-described exemplary embodiment, whether or not to superimpose a transparent image on each of the images is set and superimposition regions in cases of superimposing are set. A superimposition sequence of the images is also set. When it is set that respective transparent images are to be superimposed on two or more of the three or more images, corresponding densities at each of the pixels of the respective transparent images to be superimposed are added together, and image data of a transparent image is created and formed such that a transparent image is formed in which the respective transparent images to be superimposed are synthesized. When there are three or more images including respective color portions that are to be superimposed and synthesized, if an image with a colored portion is to be superimposed in a layer above a transparent image according to the setting of the superimposition sequence, transparent image image data is created and formed such that the transparent image is formed with a region at which the transparent image coincides with the colored portion being subtracted.

In the exemplary embodiment described above, a case of forming a color synthesized image is given as an example and described, but this is not to be limiting. In a case of forming a synthesized image of a single color that is any of C, M, Y and K, processing is the same as described above except that, in step 304, single-color image data is created instead of image data of the colors C, M, Y and K being created.

In the exemplary embodiment described above, a case of synthesized printing in which a form and data are synthesized and printed is described, but any printing in which plural images with colored portions are synthesized is acceptable and this is not to be limiting. For example, in a case of watermark printing, the above-described synthesis conditions and formation conditions may be set and printing performed in accordance with the settings. The meaning of the term "watermark printing" includes printing that prints with an image (a watermark image) embedded in an original image, the watermark image being paler and less visible than the original image. The original image and the watermark image are synthesized and printed in the same manner as the above-described form and data. Therefore, whether or not to superimpose a transparent image on the original image and a region in a case of superimposing are set, whether or not to superimpose a transparent image on the watermark image and a region in a case of superimposing are set, a superimposition sequence of the images is set, and printing is performed in accordance with these settings.

In the exemplary embodiment described above, an example in which densities of the transparent images are set is described, but this not to be limiting. For example, a unit for setting density may be not provided and densities of first and second transparent images fixed at pre-specified densities.

In the exemplary embodiment described above, a case is described in which synthesis conditions and formation conditions are specified and set at the image forming device 100 by a user controlling the display and control section 12, but this is not to be limiting. For example, the synthesis conditions and formation conditions may be set at the computer 200, the image data of the colors C, M, Y and K and the transparent image data respectively created in accordance with the settings, the created image data respectively sent to the image forming device 100 together with a print request, and printing performed using the image data so as to form an image at the image forming device 100. In such a case, programs of the image data creation section 10A and the settings processing section 10C are stored in a storage unit such as the HDD 206 or the like, such that the image data creation section 10A and the settings processing section 10C are realized at the computer 200. Thus, the first settings screen 500 and the second settings screen 600 are displayed at the display device 204 and a user using the computer 200 controls the operation device 205 and makes the settings in the first settings screen 500 and second settings screen 600 displayed at the display device 204.

Figure 20:
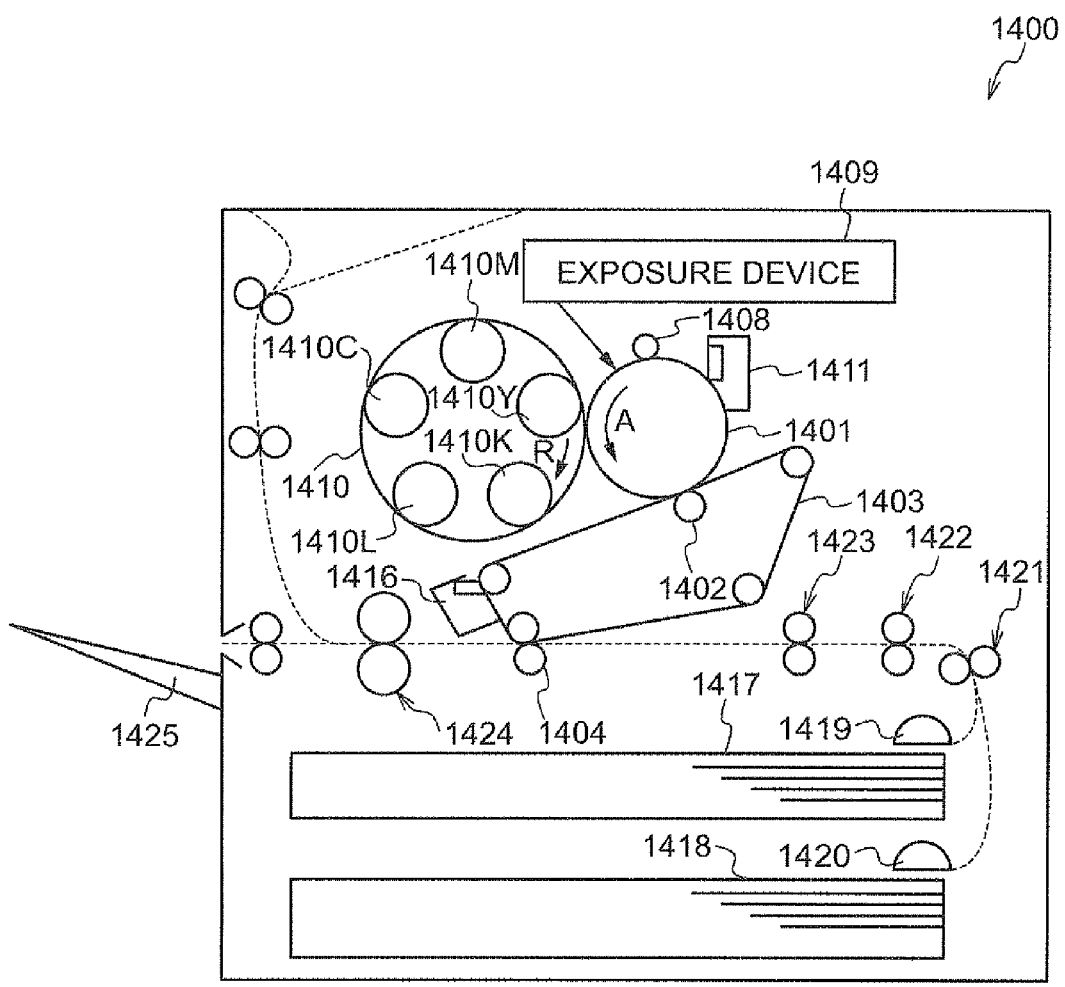
FIG. 20 is a diagram illustrating an example of an image forming device including an image formation section at which a rotary developing device is provided.

The image fowling device 100 is not to be limited to the above described tandem-type structure. For example, as illustrated in FIG. 20, an image forming device 1400 that includes an image forming section at which a rotating-type developing device 1410 is provided is possible.

A photoreceptor 1401 is provided so as to be turned in the direction of arrow A by an unillustrated motor. Around the photoreceptor 1401, a charging roller 1408, an exposure device 1409, the developing device 1410, a first transfer apparatus 1402 and a cleaning device 1411 are disposed.

The charging roller 1408 charges up the surface of the photoreceptor 1401, and the exposure device 1409 exposes the surface of the photoreceptor 1401 with a laser beam in accordance with image data and forms an electrostatic latent image.

In the developing device 1410, developing apparatuses 1410Y, 1410M, 1410C and 1410K using toner of the colors Y, M, C and K and a developing apparatus 1410L using clear toner are arranged along a circumferential direction. The developing apparatuses 1410Y, 1410M, 1410C, 1410K and 1410L develop electrostatic latent images on the photoreceptor 1401 with toner of the colors Y, M, C and K and clear toner, respectively. During development, the developing device 1410 is turned in the direction of arrow R by an unillustrated motor, and the developing apparatuses are positioned so as to oppose electrostatic latent images on the photoreceptor 1401.

The toner images developed on the photoreceptor 1401 are sequentially transferred onto an intermediate transfer belt 1403 by the first transfer apparatus 1402, and the toner images are superimposed. A belt cleaner 1416 is provided at the intermediate transfer belt 1403. Residual toner on the intermediate transfer belt 1403 is scraped off by a cleaning blade.

Recording paper, which is drawn out from a recording paper cassette 1417 or 1418 along a conveyance path by a drawing roller 1419 or 1420, is conveyed to a transfer position of a second transfer apparatus 1404 by roller pairs 1421, 1422 and 1423. The toner image formed on the intermediate transfer belt 1403 is transferred onto the recording paper at this transfer position, is heated and fixed by a fixing device 1424, and is ejected to an ejection area 1425 or a main body top face.

This image forming device 1400 is also applicable as an image forming device that forms a transparent image on a synthesized image as described in the above exemplary embodiment.

The creation of image data is implemented by software in the exemplary embodiment described above, but may also be implemented by hardware.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. A control device comprising:
    a control unit that controls generation of information for forming a first transparent image on the basis of settings that include at least a superimposition region and a superimposition sequence, the superimposition region being a region where a first color image, a second color image and the first transparent image are superimposed, and the superimposition sequence defining a sequence of superimposition of the first color image, the second color image and the first transparent image;
    wherein the settings further include a density of the first transparent image and a density of a second transparent image,
    the control unit generates the information for forming the first transparent image on the basis of the settings,
    the control unit controls generation of information for forming the second transparent image on the basis of the settings, and
    when, on the basis of the superimposition sequence, the first transparent image is to be superimposed on the first color image and the second transparent image is to be superimposed on the second color image, the control unit (i) synthesizes the first transparent image and synthesizes the second transparent image by adding the density of the first transparent image and the density of the second transparent image at each pixel thereof within the superimposition region, and (ii) generates the information for forming the first transparent image and generates the information for forming the second transparent image.

2. The control device according to claim 1, wherein, when, according to the superimposition sequence, at least one color image among the first color image and the second color image is to be superimposed in a layer over the first transparent image, the control unit generates the information for forming the first transparent image in a region that does not include a portion of the superimposition region that coincides with the at least one color image.

3. The control device according to claim 1, further comprising a setting unit that sets the settings, wherein when the setting unit sets the superimposition sequence of the settings so that the first transparent image is to be formed above the first color image and the second color image, and when the first transparent image coincides with the first color image, the control unit (i) forms the first color image above the second color image, and (ii) forms the first transparent image above the first color image.

4. The control device according to claim 1, wherein the first color image and the second color image include at least a pre-registered fixed image and an alterable image that is created to correspond with the fixed image.

5. The control device according to claim 1, wherein the superimposition region includes at least one of: a region corresponding to the whole of at least one color image among the first color image and the second color image with which the first transparent image is to be superimposed; a region coinciding with a first portion of the at least one color image; a region coinciding with a second portion of the at least one color image, the second portion being different from and not overlapping with the first portion; a region corresponding to a photograph in the at least one color image; a region corresponding to a pre-registered pattern with respect to the at least one color image; a region corresponding to a particular color in the first color image or the second color image; or a region corresponding to a particular color plate among color plates that form the at least one color image.

6. The control device according to claim 1, wherein the superimposition sequence includes at least (1) a sequence in which the first transparent image to be superimposed on the first color image and the second color image is superimposed on a topmost image among the first color image and the second color image, and (2) a sequence in which the first transparent image to be superimposed on the first color image and the second color image is respectively superimposed in layers over each of the first color image and the second color image.

7. The control device according to claim 1, wherein
    the settings further include a density of the first transparent image and a density of a second transparent image,
    the control unit generates the information for forming the first transparent image on the basis of the settings,
    the control unit controls generation of information for forming the second transparent image of the basis of the settings, and
    when, on the basis of the superimposition sequence, the first transparent image is to be superimposed on the first color image, the second transparent image is to be superimposed on the second color image, and the second color image is to be superimposed on the first transparent image and the first color image, the control unit (i) synthesizes the first transparent image in a region that does not include a portion of the superimposition region that coincides with the second transparent image and the second color image, (ii) synthesizes the second transparent image, and (iii) generates the information for forming the first transparent image and generates the information for forming the second transparent image.

8. An image forming device comprising:
    an image forming unit that forms a first color image using a first color image-forming agent, forms a second color image using a second color image-forming agent, and forms a first transparent image using a first transparent image-forming agent; and
    a control unit that controls generation of information for forming the first transparent image on the basis of settings that include at least a superimposition region and a superimposition sequence, the superimposition region being a region where a first color image, a second color image and the first transparent image are superimposed, and the superimposition sequence defining a sequence of superimposition of the first color image, the second color image and the first transparent image;

wherein the settings further include a density of the first transparent image and a density of a second transparent image, the control unit generates the information for forming the first transparent image on the basis of the settings, the control unit controls generation of information for forming the second transparent image on the basis of the settings, and when, on the basis of the superimposition sequence, the first transparent image is to be superimposed on the first color image and the second transparent image is to be superimposed on the second color image, the control unit (i) synthesizes the first transparent image and synthesizes the second transparent image by adding the density of the first transparent image and the density of the second transparent image at each pixel thereof within the superimposition region, and (ii) generates the information for forming the first transparent image and generates the information for forming the second transparent image.

9. An image forming system comprising:
an image forming device that comprises:
an image forming unit that forms a first color image using a first color image- forming agent, forms a second color image using a second color image-forming agent, and forms a first transparent image using a first transparent image-forming agent; and
a control device that comprises:
a control unit that controls generation of information for forming the first transparent image on the basis of settings that include at least a superimposition region and a superimposition sequence, the superimposition region being a region where a first color image, a second color image and the first transparent image are superimposed, and the superimposition sequence defining a sequence of superimposition of the first color image, the second color image and the first transparent image;

wherein the settings further include a density of the first transparent image and a density of a second transparent image, the control unit generates the information for forming the first transparent image on the basis of the settings, the control unit controls generation of information for forming the second transparent image on the basis of the settings, and when, on the basis of the superimposition sequence, the first transparent image is to be superimposed on the first color image and the second transparent image is to be superimposed on the second color image, the control unit (i) synthesizes the first transparent image and synthesizes the second transparent image by adding the density of the first transparent image and the density of the second transparent image at each pixel thereof within the superimposition region, and (ii) generates the information for forming the first transparent image and generates the information for forming the second transparent image.

10. A control method that controls an image forming unit that forms a first color image using a first color image-forming agent, forms a second color image using a second color image-forming agent, and forms a first transparent image using a first transparent image-forming agent, the control method comprising:

controlling generation of information for forming the first transparent image on the basis of settings that include at least a superimposition region and a superimposition sequence, the superimposition region being a region where a first color image, a second color image and the first transparent image are superimposed, and the superimposition sequence defining a sequence of superimposition of the first color image, the second color image and the first transparent image;

wherein the settings further include a density of the first transparent image and a density of a second transparent image, controlling generation of information for forming the first transparent image on the basis of the settings, controlling generation of information for forming the second transparent image on the basis of the settings, and when, on the basis of the superimposition sequence, the first transparent image is to be superimposed on the first color image and the second transparent image is to be superimposed on the second color image, (i) synthesizing the first transparent image and synthesizing the second transparent image by adding the density of the first transparent image and the density of the second transparent image at each pixel thereof within the superimposition region, and (ii) generating the information for forming the first transparent image and generating the information for forming the second transparent image.

11. A non-transitory computer readable medium storing a program causing a computer to execute a control process for controlling an image forming unit that forms a first color image using a first color image-forming agent, forms a second color image using a second color image-forming agent, and forms a first transparent image using a first transparent image-forming agent, the process comprising:

controlling generation of information for forming the first transparent image on the basis of settings that include at least a superimposition region and a superimposition sequence, the superimposition region being a region where the first color image, the second color image and the first transparent image are superimposed, and the superimposition sequence defining a sequence of superimposition of the first color image, the second color image and the first transparent image;

wherein the settings further include a density of the first transparent image and a density of a second transparent image, controlling generation of information for forming the first transparent image on the basis of the settings, controlling generation of information for forming the second transparent image on the basis of the settings, and when, on the basis of the superimposition sequence, the first transparent image is to be superimposed on the first color image and the second transparent image is to be superimposed on the second color image, (i) synthesizing the first transparent image and synthesizing the second transparent image by adding the density of the first transparent image and the density of the second transparent image at each pixel thereof within the superimposition region, and (ii) generating the information for forming the first transparent image and generating the information for forming the second transparent image.

* * * * *